United States Patent [19]

Conway

[11] Patent Number: 5,730,211
[45] Date of Patent: Mar. 24, 1998

[54] APPARATUS AND METHOD FOR OPERATING A HEAT PIPE PANEL ASSEMBLY

[75] Inventor: Paul Gerard Conway, Robbinsville, N.J.

[73] Assignee: Lockheed Martin Corporation, East Windsor, N.J.

[21] Appl. No.: 589,440

[22] Filed: Jan. 22, 1996

[51] Int. Cl.$^6$ ..................................................... F28D 15/00
[52] U.S. Cl. ........................... 165/104.14; 165/104.24; 165/104.23; 165/272; 165/274
[58] Field of Search ............... 165/104.28, 104.23, 165/104.24, 104.33, 104.14, 274, 272, 47, 42

[56] References Cited

U.S. PATENT DOCUMENTS

| | | |
|---|---|---|
| 4,067,237 | 1/1978 | Arcella ........................ 165/104.14 X |
| 4,162,701 | 7/1979 | Ollendorf ........................... 165/274 |
| 4,370,547 | 1/1983 | Ward ............................ 165/104.24 X |
| 4,880,050 | 11/1989 | Nakamura et al. ............. 165/104.14 X |
| 5,289,869 | 3/1994 | Klein et al. .................... 165/104.24 X |

*Primary Examiner*—John Rivell
*Assistant Examiner*—Christopher Atkinson
*Attorney, Agent, or Firm*—Clement A. Berard, Jr.

[57] ABSTRACT

A spacecraft equipment panel including heat pipes operable in a zero-gravity environment for cooling the equipment mounted to the panel is not operable in an Earth-gravity environment because the two-phase working fluid in the heat pipes tends to pool at the bottom of the heat pipe when the heat pipe is vertical. An apparatus and method for overcoming this condition employs infrared lamps positioned on a mounting frame to heat the bottoms of the heat pipes to vaporize the working fluid therein, whereby the heat pipes become operable for transporting heat while in a vertical orientation and under the influence of gravity.

9 Claims, 4 Drawing Sheets

APPARATUS AND METHOD FOR OPERATING A HEAT PIPE PANEL ASSEMBLY

The present invention relates to apparatus and method for operating articles including heat-transport pipes.

Spacecraft include many pieces of equipment mounted to a structural enclosure and some of these equipment generate significant amounts of heat in a localized area when operating. In the vacuum of space, a thermal balance must be maintained within the spacecraft solely by employing conduction of heat in the spacecraft structure and radiation of heat from external spacecraft surfaces. Conventional spacecraft accomplish this end by employing heat-transport pipes embedded within structural panels. The exterior surfaces of these panels serve as heat-radiating surfaces to space and the interior surfaces thereof serve as mounting surfaces for the aforementioned equipment.

Conventional heat-transport pipes are elongated hollow tubes, usually made of aluminum, sealed at each end and containing a two-phase working fluid such as ammonia. In space at essentially zero gravity, the working fluid is free to distribute itself throughout the heat-transport pipe in both its liquid and gaseous states, vaporizing and condensing as a function of the thermal conditions at various points along its length, thereby to tend to maintain a uniform temperature along its length. At the Earth's surface, however, under the influence of gravity, the working fluid tends to pool at the lowest point in the heat-transport pipe, e.g., at the bottom end if the length of the heat-transport pipe is vertical. For many spacecraft panel configurations, testing in other than a vertical orientation is either disadvantageous or impractical. As a result, the heat carrying capacity of the heat-transport pipe is drastically reduced, and the equipment mounted to the panel assembly cannot be operated or tested without danger of exposure to excessively high temperatures.

Conventional logic leads one to cool the panel assembly to remove heat, such as by blowing moving air generated by a fan or cooled air generated by an air conditioner on it. Testing has shown that this approach fails where physically small equipment generates significant heat, as the case with many modern high-power communication satellites.

Accordingly, there is a need to operate and test such equipment panel assemblies in a gravity environment. The present invention, contrary to conventional logic, applies localized heat to the panel to be operated and tested to achieve improved heat transport capacity in the heat-transport pipes thereby to maintain lower panel temperatures than is otherwise possible.

The present invention comprises a panel having a heat-radiating surface, an equipment mounting surface and heat-transport pipes for thermally coupling the equipment to the radiating surface. A mounting frame has a plurality of infrared energy sources mounted thereon at locations corresponding to the bottom ends of the heat-transport pipes and oriented for directing infrared energy proximate such ends. The amount of infrared energy applied thereto is controlled for causing the heat-transfer fluid contained in the heat-transport pipes to vaporize. A volume of cooled gas is directed against the surface of the panel.

The method of the present invention comprises placing a panel assembly in an orientation wherein its heat-transport pipes are substantially vertical, mounting and positioning a plurality of infrared energy sources on a frame proximate the bottom ends of the heat-transport pipes, energizing the infrared energy sources to apply energy to vaporize the working fluid within the heat-transport pipes, and energizing heat-generating equipment mounted on the panel assembly and directing a volume of cooled gas upon the panel.

Figure 1:
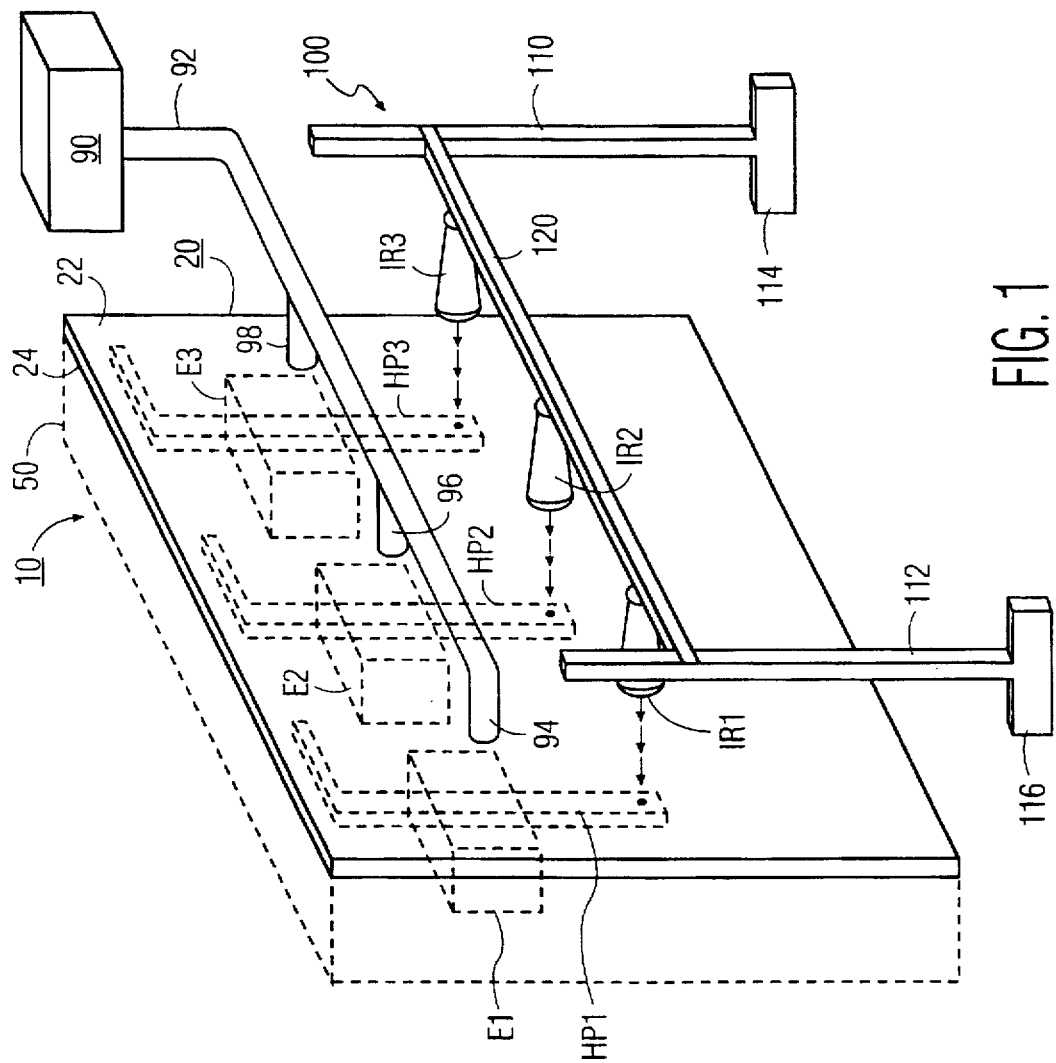
FIG. 1 is a diagram including an embodiment of the present invention.

In FIG. 1, a spacecraft 10 includes a conventional planar panel assembly 20 which is oriented in a vertical plane. Panel assembly 20 is held in place by being attached to a support frame or device 50 which could, for example, be the body of spacecraft 10. Panel 20, to be described in greater detail below with respect to FIG. 2, includes a planar surface 22 adapted to be exterior to spacecraft 10 for radiating heat into space and a planar surface 24 adapted for the mounting of heat dissipating equipment E1, E2, E3 interior to spacecraft 10. Heat-transport pipes HP1, HP2 and HP3 are affixed to panel 20 for conducting heat generated by equipment E1, E2, E3 to radiating surface 22 and distributing said heat across surface 22.

When equipment E1, E2, E3 is operated in the zero-gravity environment of space, the heat generated is efficiently and effectively conducted along the lengths of heat pipes HP1, HP2, HP3 which are hollow tubes, sealed at both ends, containing a two-phase working fluid such as ammonia. The working fluid is free to move and distribute itself throughout the tube, vaporizing at hotter locations and condensing at cooler locations thereby transporting heat along the lengths of heat pipes HP1, HP2, HP3 which thereby tend to become isothermal.

In a gravity environment, however, the liquid working fluid pools at the lower end of heat pipes HP1, HP2, HP3 and they can not effectively transport heat along their lengths. As a result, heat generated by equipments E1, E2 and E2 is not removed and the equipment rapidly heats up. For example, high power equipment such as travelling wave tubes (TWT) and solid state power amplifiers (SSPA) that operate safely in space while generating about 94 watts and 80 watts, respectively, will reach damage-causing temperatures in excess of 85° C. within 3–10 minutes when operated on Earth. Conventional logic would suggest employing large fans to blow ambient air or air conditioners to direct cooled air on panel surfaces 22 or 24 or both. Nevertheless, these high temperatures still occur.

However, when sufficient heat is applied to panel 20 proximate to the bottom ends of heat pipes HP1, HP2, HP3, the pooled liquid working fluid vaporizes and the heat pipes operate in the usual or "reflux" mode where heat is transported by the vaporization and condensation of the working fluid. The surprising result is that by applying heat to a panel that would otherwise heat to unsafe temperatures, the temperature of the heat-generating equipment is reduced and is maintained at safe, lower temperatures.

To this end, mounting frame 100 provides mounting points for infrared (IR) lamps IR1, IR2, IR3 oriented to direct infrared energy to radiating surface 22 of panel 20 at locations proximate to the respective bottom ends of heat pipes HP1, HP2, HP3. Frame 100 includes two vertical members 110, 112 including respective feet 114, 116 which may rest on the floor. Horizontal member 120 is attached at its ends to vertical members 110 and 112 at locations selected to position horizontal member 120 and IR lamps IR1, IR2, IR3 vertically proximate to the bottom ends of heat pipes HP1, HP2, HP3. IR lamps IR1, IR2, IR3 are adjustably mounted to member 120 for being positioned horizontally proximate to the bottom ends of heat pipes HP1, HP2, HP3.

In addition, air conditioner 90 provides a cooled gas, for example, air or dry nitrogen, which flows through duct 92 to outlet ports 94, 96, 98 which are positioned for directing the cooled gas against radiating surface 22 of panel 20 at locations corresponding to the locations of heat-generating equipment E1, E2, E3 on mounting surface 24 of panel 20.

Where an item is shown in more than one drawing figure, the same alphanumeric designator is used with respect to all illustrations of such item.

Figure 2:
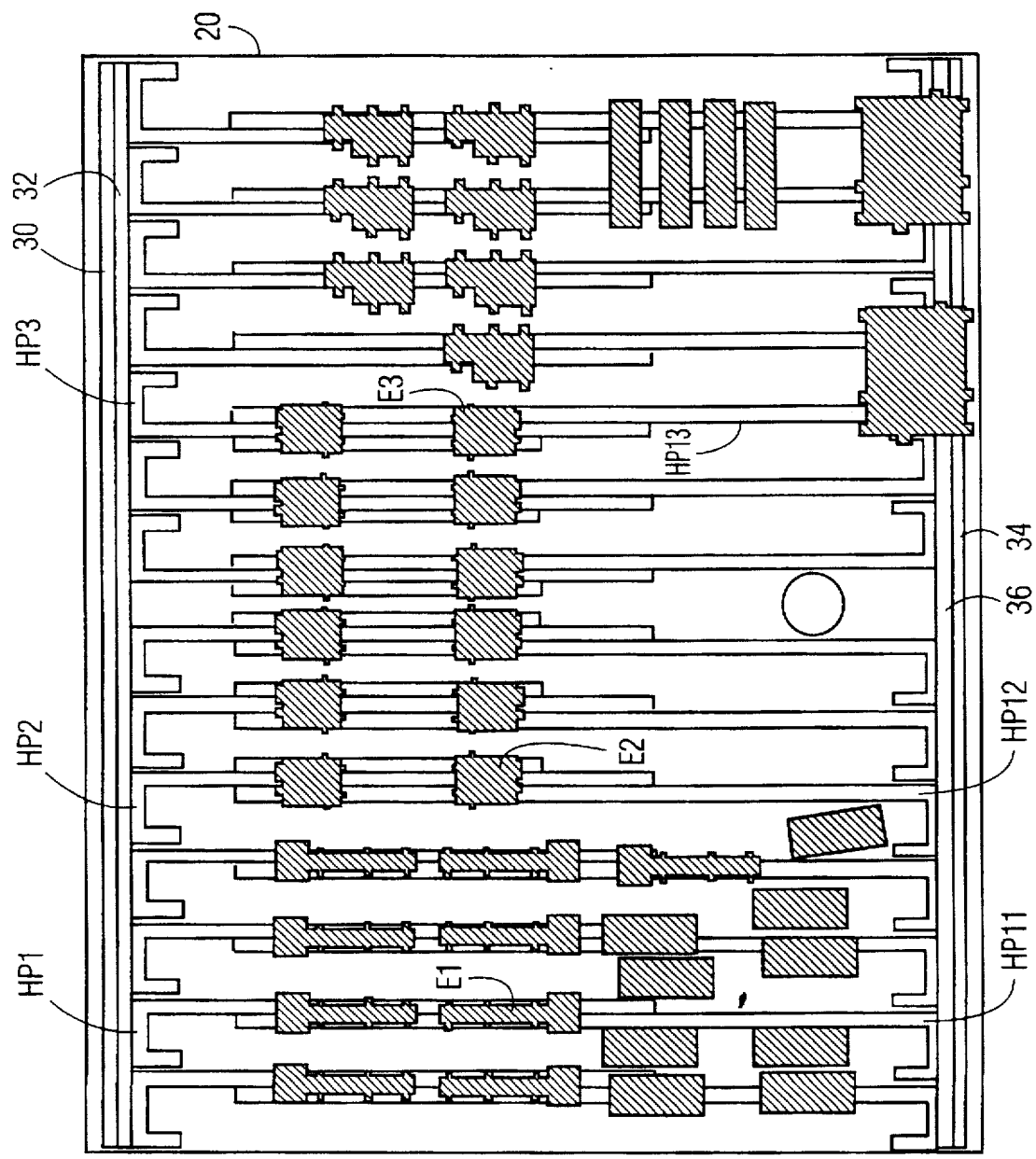
FIGS. 2, 3, 4 and 5 are diagrams of details associated with the embodiment of FIG. 1.

In FIG. 2, salient features affecting the thermal design of a typical panel 20 are shown schematically viewed from the mounting surface 24 side with that surface removed to reveal the arrangement of heat pipes within said panel. In that arrangement, a plurality of pairs of J-shaped heat pipes are arranged vertically between the top and bottom edges of panel 20; each pair includes an upper J-shaped heat pipe, of which HP1, HP2, HP3 are examples, the bottom portion of which is thermally coupled to the upper portion of a lower J-shaped heat pipe, of which HP11, HP12, HP13 are examples. A pair of I-shaped heat pipes 30, 32 are positioned along the upper edge of panel 20 and are thermally coupled to each other and to the tops of the upper J-shaped heat pipes. Similarly, I-shaped heat pipes 34, 36 along the lower edge of panel 20 are thermally coupled to each other and to the bottoms of the lower J-shaped heat pipes.

Heat-generating equipment mounted to panel 20 in FIG. 2 are shown as black boxes of which equipments E1, E2, E3 are examples. Equipment E1 is illustrated in the shape of a TWT of which eight are shown. A TWT producing about 60 watts of RF output power will generate 40-45 watts, for example, of heat to be dissipated. Equipment E2 is illustrated in the shape of an SSPA of which twelve are shown. An SSPA may generate about 80-90 watts, for example, of heat to be dissipated. Various other equipment of differing sizes and shapes are shown, but generate lesser amounts of heat to be dissipated. The particular panel and equipment configuration, and description thereof, is not necessary to an understanding of the present invention.

Figure 3:
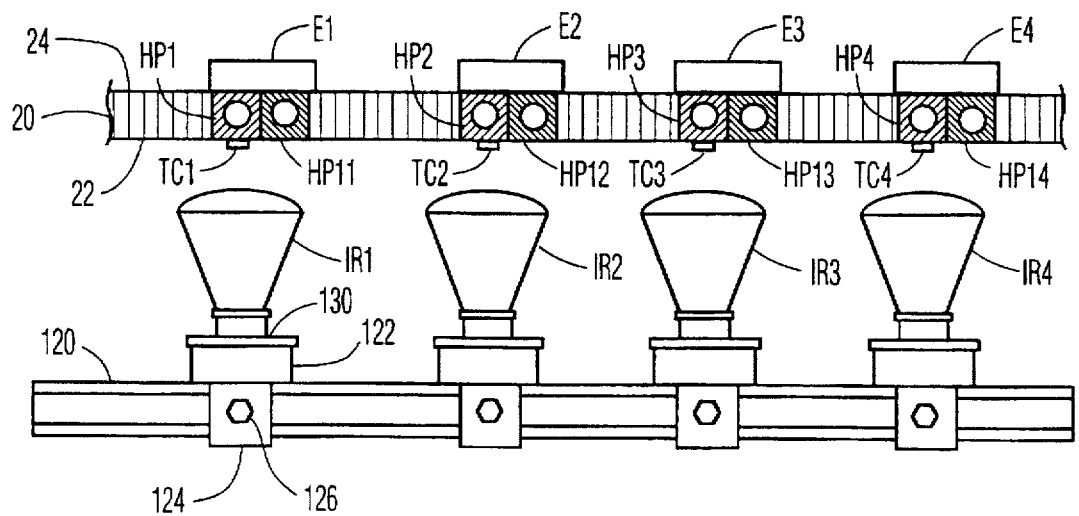

FIG. 3 shows a plan view of portions of panel 20 (cut away) and horizontal member 120 of the apparatus of FIG. 1, but with four equipments E1, E2, E3, E4 and four IR lamps IR, IR2, IR, IR4. Panel 20 is cut away to show cross-sections of pairs of J-shaped heat pipes, for example, HP1 and HP11, in thermal contact with each other and with the radiating surface facesheet 22, the mounting surface facesheet 24 and therefore with equipments E1, E2, E3, E4. IR lamps IR1, IR2, IR3, IR4 are adjustably mounted on horizontal member 120 (as is described in detail in relation to FIG. 4) in horizontal positions corresponding to heat pipes HP1, HP2, HP3, HP4 for directing infrared energy at the bottom ends of said heat pipes. Typically, panel 20 includes 5-10 mil thick aluminum facesheets 22, 24 with an aluminum honeycomb 26 filling spaces between the facesheets not containing heat pipes or other structural members. Facesheet 22 is covered with materials having the desired thermal-optical characteristics, such as optical reflector mirrors.

Thermocouples TC1, TC2, TC3, TC4 are attached to radiating surface 22 of panel 20 at locations proximate to the respective bottom ends of heat pipes HP1, HP2, HP3, HP4 opposite IR lamps IR1, IR2, IR3, IR4, respectively, for measuring the temperature of panel 20 at such locations. It is preferred to use an aluminum tape (not shown) to attach each thermocouple to avoid creating a hot spot. When an IR lamp is energized it directs infrared energy to panel 20 proximate to the bottom end of the respective heat pipe with which it is associated, preferably about two inches above the bottom end, causing the temperature thereof to rise. When the heat pipe reaches the temperature at which its working fluid vaporizes, it then enters the reflux mode of operation in which it is a more effective transporter of heat and, because it then transports heat away from its bottom end, the temperature thereat decreases and stabilizes. This temperature drop is useful to indicate that IR lamps IR1, IR2, IR3, IR4 are directing sufficient infrared energy at panel 20 to cause reflux in heat pipes HP1, HP2, HP3, HP4, respectively.

Figure 4:
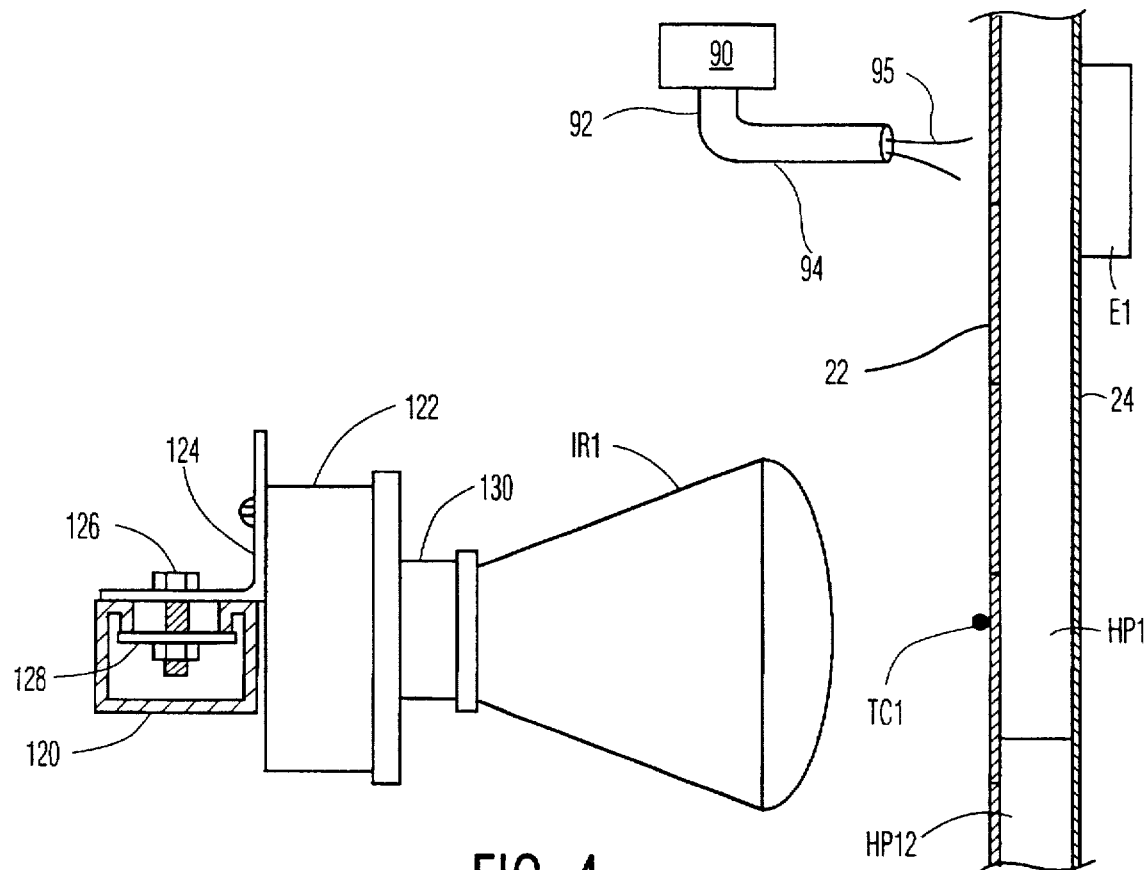

FIG. 4 shows an elevation cross-sectional view of portions of the apparatus of FIG. 1 including the position of exemplary IR lamp IR1 with respect to thermocouple TC1 and the bottom end of heat pipe HP1, and the position of outlet duct 94 directing cooled air 95 at panel 20 opposite equipment E1, preferably at about two to four inches from panel 20, but not on the IR lamp or the localized area it is heating. Conventionally, IR lamp IR1 is installed in porcelain fixture 130 which is mounted on electrical junction box 122. Junction box 122 is affixed to angle bracket 124 which is adjustably mounted to horizontal member 120. For example, member 120 is a C-shaped channel having flanges to which angle bracket 124 is clamped by nut and bolt 126 and clamping plate 128. The horizontal position of IR lamp IR1 is easily changed by loosening nut and bolt 126, sliding box 122 and lamp IR1 to a new position and tightening nut and bolt 126. All IR lamps are similarly mounted to horizontal member 120.

In like manner, vertical member 110, 112 can also be a C-shaped channel to which tabs or angle brackets at each end of horizontal member 120 are clamped by a nut and bolt, horizontal member 120 being thereby adjustable vertically.

Figure 5:
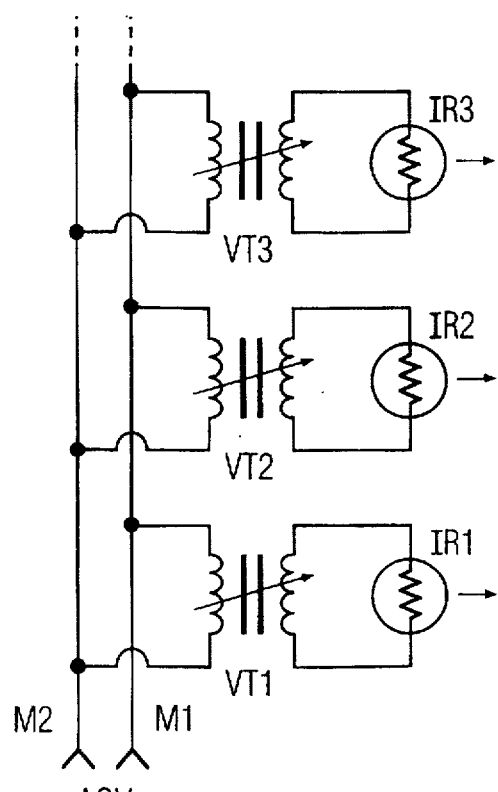

FIG. 5 is a schematic diagram of an electrical circuit in which electrical power ACV is connected via mains M1, M2 to variable transformers VT1, VT2, VT3 and thence to IR lamps IR1, IR2, IR3. The ratio of variable transformers VT1, VT2, VT3 is adjusted for controlling the electrical input to IR lamps IR1, IR2, IR3 thereby controlling the amount of infrared energy each directs at panel 20. Typically, 250 watt IR flood lamps are operated at about 120 volts to initiate reflux and later increased to about 130 volts.

In the method according to the present invention, panel 20 is placed with heat pipes HP1, HP2, HP3 in a vertical orientation and mounting frame 100 is placed proximate thereto with IR lamps IR1, IR2, IR3 mounted and positioned thereon on members 110 and 120 about two inches away from panel 20 to direct infrared energy at about two inches above the bottom ends of heat pipes HP1, HP2, HP3. IR lamps IR1, IR2, IR3 are energized to so direct infrared energy and the temperature of the panel is monitored proximate the bottom ends of heat pipes HP1, HP2, HP3 using thermocouples TC1, TC2, TC3, respectively, to determine when the temperature ceases to increase and then drops and stabilizes, indicating that heat pipes HP1, HP2, HP3 are in reflux operation. Heat-generating equipment E1, E2, E3 is energized. Cooled air 95 from an air conditioner 90 is directed at panel 20 at locations opposite those where equipment E1, E2, E3 are mounted.

Figure 6:
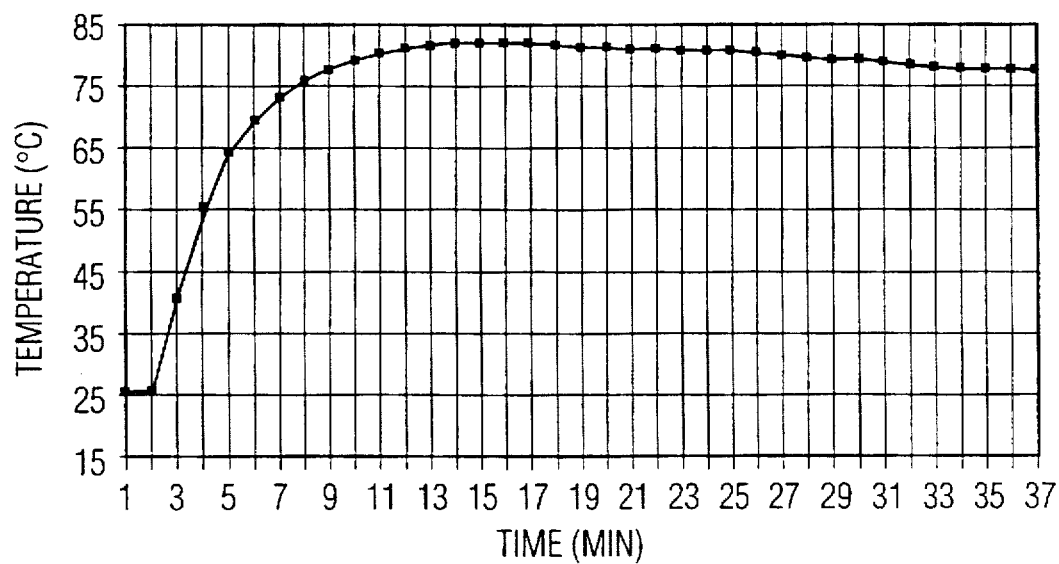
FIG. 6 is a plot of temperature related to the embodiment of FIG. 1.

FIG. 6 is a graph of the temperature of one equipment which is energized to about 94 watts at time=2 minutes, i.e. after the heat pipes are in reflux and panel temperature has stabilized; the temperature at the associated thermocouple is not illustrated.

Other embodiments and variants of the present invention will be apparent to one of ordinary skill in the art and the scope of the present invention shall be limited only by the claims below. For example, several horizontal members 120, each having plural IR lamps adjustably mounted thereon, could be adjustably mounted to vertical members 110, 112 to permit a more complex array of IR lamps corresponding to a more complex arrangement of heat pipes within panel 20.

What is claimed is:

1. Apparatus for operating a panel assembly, said panel assembly comprising:

a panel having a first planar surface for radiating heat energy therefrom, and a second planar surface for mounting heat-generating equipment thereon;

a plurality of heat-transport pipes intended for operation in a substantially zero-gravity environment and containing a two-phase heat-transfer fluid therein, said heat-transport pipes being affixed to said panel for thermally coupling said heat-generating equipment to said first planar surface; and a plurality of said heat-generating equipment affixed to the second planar surface of said panel and thermally coupled to ones of said plurality of heat-transport pipes;

said apparatus comprising:

means for mounting said panel assembly in a substantially vertical orientation wherein said ones of said heat-transport pipes that are thermally coupled to said heat-generating equipment are in a substantially vertical orientation, whereby the heat-transfer fluid in said heat-transport pipes tends to pool at a bottom end of said heat-transport pipes under the influence of gravity;

a plurality of infrared energy sources each having a controllable level of infrared energy output in a predetermined direction;

a mounting frame having a plurality of mounting points thereon at which ones of said plurality of infrared energy sources are mounted, each said mounting point being located at a horizontal and a vertical location substantially corresponding to that of the bottom end of one of said plurality of heat-transport pipes, wherein each said infrared energy source is oriented with its said predetermined direction oriented for directing infrared energy proximate the bottom end of one of said heat-transport pipes, whereby infrared energy is transferred from said infrared energy sources to the bottom ends of said heat-transport pipes;

means for controlling the infrared energy output of said infrared energy sources for applying an amount of infrared energy to the respective bottom ends of said ones of said plurality of heat-transport pipes for causing said heat-transfer fluid therein to vaporize, whereby said heat-transport pipes can operate in a reflux mode for transporting heat from said heat-generating equipment to the first planar surface of said panel assembly; and a source of a volume of cooled gas including means for directing said volume of cooled gas against the first planar surface of said panel at locations corresponding to the locations of said heat-generating equipment on the second planar surface of said panel.

2. The apparatus of claim 1 wherein said infrared energy source includes an infrared electric lamp coupled for receiving electrical power from a source thereof.

3. The apparatus of claim 2 wherein said means for controlling the infrared energy output of said infrared energy source includes a variable transformer for varying the electrical power applied to said infrared electric lamp.

4. The apparatus of claim 1 wherein said mounting frame comprises at least one horizontal member, at least one vertical member and means for mounting said horizontal member to said vertical member, wherein said means for mounting said horizontal member is adjustable for positioning infrared energy sources mounted to said horizontal member at said mounting points at a height substantially corresponding to that of the bottom ends of said heat-transport pipes.

5. The apparatus of claim 4 further including means for mounting said infrared energy sources along said horizontal member, wherein said means for mounting said infrared energy sources are adjustable for positioning said infrared energy sources at said mounting points at horizontal locations substantially corresponding to those of the bottom ends of said heat-transport pipes.

6. A method for operating a panel assembly having a plurality of heat-transport pipes having a two-phase working fluid therein for transporting heat from heat-generating equipment mounted on one surface of said panel assembly and for distributing said heat across an opposing surface of said panel assembly, said method comprising the steps of:

(a) placing said panel assembly in an orientation wherein said heat-transport pipes are in a substantially vertical orientation, whereby said two-phase working fluid tends to pool at a bottom end thereof under the influence of gravity;

(b) mounting a plurality of directional sources of infrared energy on a mounting frame;

(c) placing said mounting frame proximate said opposing surface of said panel assembly;

(d) positioning said directional sources of infrared energy on said mounting frame proximate the respective bottom ends of said heat-transport pipes in an orientation for directing infrared energy to the bottom ends of said heat-transport pipes;

(e) energizing said infrared energy sources for applying infrared energy to the bottom ends of said heat-transport pipes in an amount effective for vaporizing the two-phase working fluid pooled thereat;

(f) energizing said heat-generating equipment for the operation thereof; and (g) directing a volume of cooled gas upon the opposing surface of said panel assembly at locations opposite those at which said heat-generating equipment is mounted on the one surface of said panel assembly.

7. The method of claim 6 wherein the step of energizing said infrared energy sources includes the steps of coupling a variable source of electrical energy to said infrared energy sources and varying the amount of electrical energy applied to said infrared energy source for producing said effective amount of infrared energy.

8. The method of claim 6 wherein the steps (e), (f) and (g) are performed in the sequence of step (e), then step (g) and then step (f).

9. The method of claim 6 wherein step (e) precedes step (g) and further including the steps:

(h) monitoring the temperature of said panel assembly proximate the bottom ends of said heat-transport pipes;

(i) waiting for said temperature to increase to a peak value and then to decrease and stabilize at a value less than said peak value; and then performing step (g).

* * * * *